Feb. 25, 1964  J. H. OXLEY  3,122,595
CONTROLLED NUCLEAR REACTOR DISPERSIONS AND METHOD OF MAKING
Filed Dec. 4, 1961
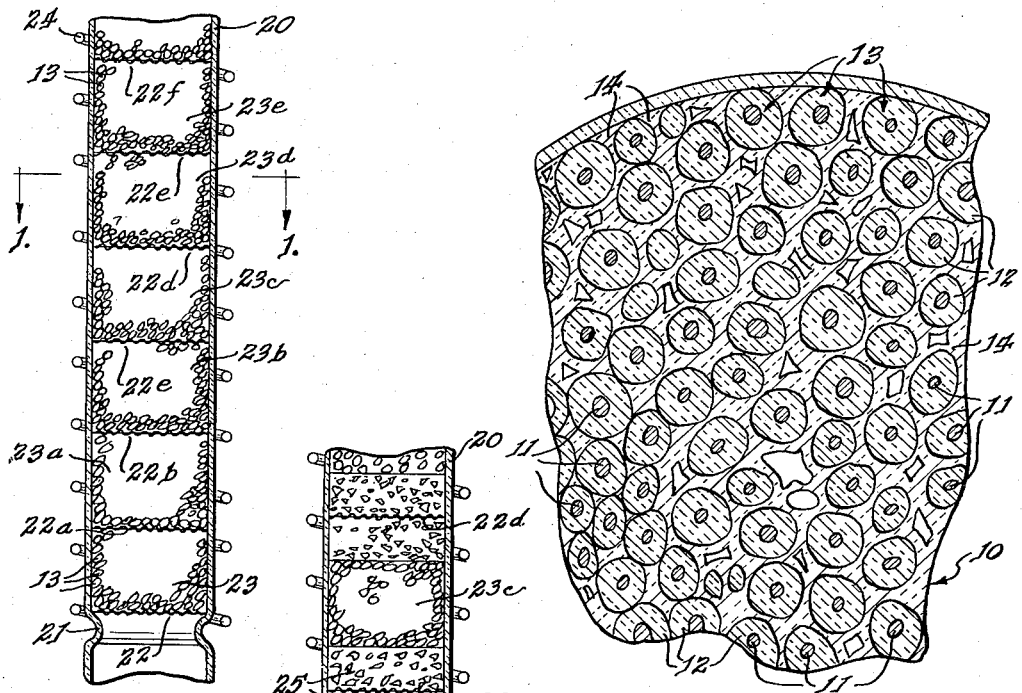
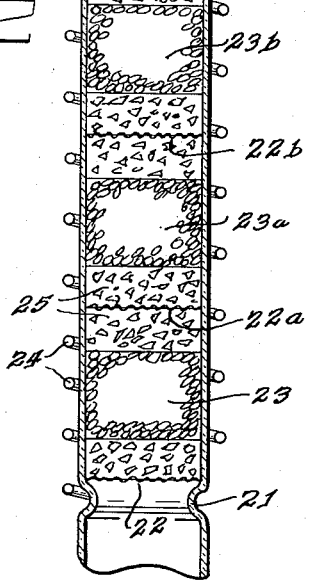
INVENTOR.
Joseph H. Oxley
BY
Roland A. Anderson
Attorney

United States Patent Office 3,122,595
Patented Feb. 25, 1964

3,122,595
CONTROLLED NUCLEAR REACTOR DISPERSIONS AND METHOD OF MAKING
Joseph H. Oxley, Columbus, Ohio, assignor to the United States of America as represented by the United States Atomic Energy Commission
Filed Dec. 4, 1961, Ser. No. 157,025
7 Claims. (Cl. 264—21)

The invention relates to novel dispersions of fissionable fuel materials within a matrix, characterized by accurately controlled distances between the particles of the material, and to a method of making the same.

Fissionable fuel materials, for use in nuclear reactor fuel elements, are advantageously dispersed within a metal or ceramic matrix for several reasons. The matrix tends to contain fission products; it may act as a moderator, as when carbon is the matrix material; and, finally, if the dispersion could be made uniform the matrix would then preserve the distances between the fuel particles, thereby maintaining the desired ratio of moderator to fuel and otherwise meeting the exacting geometrical requirements of reactor design.

Under present practices, however, there is no way in which the distances referred to can be made substantially uniform in order for the matrix to preserve them. All expedients that have been tried merely bring about a limited degree of improvement, but no practical way is known for controlling the distances between the particles to any degree of accuracy.

It is also desirable that a matrix have good mechanical strength.

It is, accordingly, an object of the invention to provide a dispersion of fissionable fuel particles within a matrix having uniform, controlled distances between the particles, and of superior mechanical strength.

It is a more particular object to provide a method of producing a dispersion of the kind just described.

Other objects will appear as the description proceeds.

The foregoing objects are attained by my discovery that if fissionable fuel particles are given a uniform coating of sufficient thickness to produce spheres having diameters equal to the desired distance between the centers of the particles, the spheres may then be brought into a close-packed arrangement and the spaces between them may be substantially filled by decomposition or reaction of a gas or gas mixture which will yield a solid material identical with or otherwise compatible with the coating of the spheres. By my discovery that, under certain conditions, such substantial filling of the interstitial spaces may be attained, I am able to produce a dispersion of the fuel particles with accurately controlled distances between their centers, since the close-packed arrangement is not disturbed by the gas as it diffused between the spheres to bind them together. Such a dispersion has superior mechanical strength compared to matrices produced by methods now in use as well as superior nuclear qualities due to its reliable geometric configuration.

In the drawing,

FIGURE 1 is a partial transverse sectional view of a dispersion of fissionable fuel made according to the invention, taken along the line 1—1 of FIGURE 2.

FIGURE 2 is a longitudinal sectional view of an apparatus which may be used for making the dispersion of FIGURE 1.

FIGURE 3 is a partial longitudinal sectional view of a variation of the apparatus of FIGURE 2.

In FIGURE 1, the dispersion, shown generally at 10, consists of lumps 11 of fissionable fuel surrounded by coatings 12 to make up a plurality of spheres 13 of virtually equal diameter. The spheres 13 are arranged, as shown, in an approximately close-packed configuration of each sphere in tangential contact with substantially all its nearest neighbors, with the interstices 14 substantially filled by matrix material identical or compatible with the coatings 12.

In FIGURE 2 the spheres 13 are placed in a glass tube shown generally at 20, which has a constriction 21 over which is a mesh disk 22 having a diameter about equal to the inside diameter of the tube 20, but greater than that of the constriction 21. The mesh of the disk 22 is, of course, fine enough to contain the spheres 13.

Above the disk 22 is a layer 23 of spheres 13 which are brought into a close-packed configuration with each other by vibration, tapping and the like, after which a second mesh disk 22a is placed on top of the layer 23. A second layer 23a is then placed on top of the disk 22a and the spheres 13 are brought into close-packed configuration in this manner as was done for layer 23, it being understood that the process is continued with disk 22b, 22c, layers 23b, 23c, and so on until the requisite number of layers with dividing disks has been placed in tube 20. The vibration, tapping, and the like to bring about a close-packed configuration of the spheres 13 may be deferred until all the layers and disks have been placed in the tube 20 and then carried out at one time, but we prefer to do this a layer at a time as already described.

After the layers have been placed in the tube 20, the tube and its contents is heated by induction coil heater 24 and the inside of the tube 20 is preferably evacuated and purged with inert gas from a gas source (not shown). Then from another source (not shown) a gas or combination of gases is led from one end of the tube 20 through the layers of spheres 13 to the other end, which gas will decompose, pyrolyze, or the combination of gases react together, to deposit a solid within the interstices 14 between the spheres 13, and cohere them together in a substantially continuous dispersion 10 as shown in FIGURE 1. It is preferable to reverse the gas flow through the tube from time to time in carrying out the process described. Details of the gases which may be used will be given later on.

FIGURE 3 shows a variation of the method of making the dispersion of the invention; it is exactly like that in FIGURE 1 except that over the mesh disk 22 there is placed a thin layer 25 of carbon particles such as petroleum coke particles, and above and below each of the succeeding disks 22a, 22b, 22c and so on similar layers of carbon particles are placed. The carbon particles should be coarser than the spheres 13, so that the matrix material from the decomposed gas will not bind them together; the carbon particle layers act as a parting material and permit the pellets formed by the layers 23, 23a, etc., to be separated more easily than can be done when they are in direct contact with the mesh disks 22, 22a, etc.

The principle of our invention may be applied to a wide number of materials by means of a correspondingly large number of gases and gas combinations. When the spheres 13 are of metal, metal carbonyl gases may be used; these will diffuse through the close-packed spheres and decompose under heat and fill the interstices 14 with metal.

By various techniques it is known how to produce spheres covered with various ceramics such as alumina, carbon and the like. In order to bind these together by the method of the invention, they are first placed in a close-packed configuration as already described, and then a gas or mixture of gases is caused to diffuse through the configuration to fill the interstitial spaces by decomposition or reaction of the gases. In the case of spheres coated with alumina or zirconia the diffusing gases are a mixture either of aluminum chloride vapor and steam, or zirconium chloride vapor and steam as the case may be; the chloride will react with the steam to form HCl and the oxide of the metal which deposits upon the spheres to fill the spaces and build up a continuous matrix which will firmly hold the fuel lumps at the center of the spheres in fixed position. Chromia is preferably deposited by a mixture of hydrogen and chromyl chloride vapor; the hydrogen will reduce the latter to chromia which will then deposit in the same manner. Carbon may be deposited by pyrolysis of carbon containing compounds such as methane, ethane, acetylene, ethylene, and the like.

It is to be understood that the invention may be applied in a great number of possible combinations; the fuel lumps or particles 11 may be either metallic, such as uranium, plutonium and the like, or ceramic, such as the oxides, nitrides, sulfides and the like of the same metals. The coatings 12 may be metal with suitable nuclear properties such as aluminum, magnesium, zirconium and their alloys, carbon steel, stainless steel, and the like, or they may be ceramic such as alumina, carbon, and the like, or combinations of these.

The material deposited within the interstitial spaces to complete the matrix are, in most cases, preferably the same as the materials of the coatings. However, in certain cases it is preferable for somewhat different materials to be used. Thus, it is probably preferable to deposit pure nickel, through decomposition of nickel carbonyl, within the interstices between stainless steel spheres, rather than to attempt to duplicate a complicated stainless steel composition. Likewise, it is preferable to deposit pure alumina in the interstices between spheres coated with a mixture of alumina and a minor amount of chromia, since the purpose of the chromia is merely to avoid an "onion skin" effect on the spheres, and this is not a problem in the interstitial deposits. Again, with an alumina coating filling the interstices with carbon may be preferable as the moderating effect of carbon is thus included. With such a broad scope as that of the present application, it is impossible to describe all the variations which may be applicable to all the possible combinations of materials, but the general principles of the invention hold good in all cases.

Dispersions with matrices made according to the invention show superior nuclear properties and superior mechanical strength. I have found that superior strength and more complete filling of the interstitial spaces is greatly aided by passing the gas through the configuration at comparatively slow rates; for example, methane passing through at 40 cm.$^3$ per minute produced a reduction in voids of 75%, as compared to only 20% when the rate was 500 cm.$^3$ per minute.

*Example I*

Into a quartz glass tube two feet long and of 6.5 mm. internal diameter was inserted a circular 48 mesh disk of slightly smaller diameter, which came to rest across a constriction in the tube near its bottom. Over the disk was placed a sufficient quantity of uniform spheres to make a layer 0.200 inch thick after solidifying the layer by tapping. The spheres contained at their centers particles of $UO_2$ of 127 micron particle size, each particle being coated with an intermediate layer of $Al_2O_3$ 50 microns thick, and an outer layer of pyrolytically deposited carbon of sufficient thickness to make the outer diameter of the spheres 470 microns. A second disk of the same diameter and mesh was placed over the layer of spheres and a second layer was placed over the second disk in the same manner, and the process was repeated until there were six layers, separated by disks, in the tube.

The tube was then placed inside a heating coil and connected at its top to a partial vacuum line and at its bottom to a gas supply line having a flowmeter, each line being provided with a manometer to measure the pressure drop across the static bed of the layers within the tube. The induction heater was turned on in order to raise the temperature of the static bed to the temperature range of 1150° to 1175° C., the gas supply line was connected to a helium source, and the static bed was purged with helium for a few minutes at a pressure drop of 10 mm. Hg. The gas supply line was then disconnected from the helium source and simultaneously connected to a methane source, and methane passed through the assembly at the rate of about 500 cm.$^3$ per minute for 360 minutes, until the pressure drop exceeded approximately 200 mm. Hg. The heater and the gas supply line were then turned off and the assembly permitted to cool.

The tube was inverted and the spheres were seen to have cohered into six continuous pellets 0.256 inch in diameter and 0.200 inch high, which were separated from each other by breaking them apart, and the disks were removed. On sectioning, it was found that about 20 percent of the interstitial spaces had been filled with pyrolytic carbon.

*Example II*

The same procedure was followed as in Example I, except that layers about ⅛ inch thick of spherical coke from 590 to 710 microns in diameter were placed above and below each layer of fuel-containing spheres, and the flow of methane was 40 cm.$^3$ per minute and was maintained for 1100 minutes until the pressure drop across the tube reached 380 mm. Hg. Sectioning the pellets produced in this case revealed that 75% of the interstitial voids had been filled with pyrolytic carbon. Crushing strength tests showed a crushing strength for the pellets of 9300 p.s.i., as compared to 6000 p.s.i. for pellets made by conventional techniques.

It will be understood that this invention is not to be limited to the details given herein but that it may be modified within the scope of the appended claims.

What is claimed is:

1. A method of making a matrix containing nuclear fuel particles with uniform distances therebetween, comprising coating the particles to make a plurality of spheres of substantially uniform diameter, arranging the spheres in a substantially close-packed configuration, diffusing through the configuration a decomposable gas which on decomposition yields a solid product, heating the configuration while the gas is being diffused to a temperature to cause decomposition of the gas, thereby causing the interstitial spaces between the spheres to become substantially filled with the solid product.

2. The method of claim 1 where the decomposable gas is methane.

3. The method of claim 6 where the decomposable gas is a metal carbonyl.

4. A method of making a matrix containing nuclear fuel particles with substantially uniform distances therebetween, comprising coating the particles to make a plurality of spheres of substantially uniform diameter, arranging the spheres in a substantially close-packed configuration, diffusing through the configuration a combination of reactable gases which, on reaction, gives a solid product, heating the configuration to a temperature to produce a reaction between the reactable gases, thereby causing the interstitial spaces between the spheres to become substantially filled with the solid product.

5. The method of claim 4 where the reactable gases are aluminum chloride and steam.

6. The method of claim 4 where the reactable gases are zirconium chloride and steam.

7. The method of claim 4 where the reactable gases are chromyl chloride and hydrogen.

References Cited in the file of this patent

UNITED STATES PATENTS

| | | |
|---|---|---|
| 2,719,779 | Bray et al. | Oct. 4, 1955 |
| 2,894,320 | Gurinsky et al. | July 14, 1959 |

FOREIGN PATENTS

| | | |
|---|---|---|
| 648,293 | Great Britain | Jan. 3, 1951 |
| 831,679 | Great Britain | Mar. 30, 1960 |
| 878,927 | Great Britain | Oct. 4, 1961 |

OTHER REFERENCES

1st Geneva Conference on Atomic Energy, vol. 9, pp. 196–202, April 1956. Copy in Library, TK9006 I5.

Nuclear Fuels, by Gurinsky et al., February 4, 1957, pub. by Van Nostrand Co., New Jersey, pp. 278–286. Copy in Library.

AEC Report KAPL–1909, October 1957, pp. 12 and 15–17. Copy in Library.